United States Patent
Schweikert et al.

(10) Patent No.: US 6,366,446 B1
(45) Date of Patent: Apr. 2, 2002

(54) ALUMINUM ELECTROLYTIC CAPACITOR ASSEMBLY

(75) Inventors: Wilhelm Schweikert; Rainer Hebel, both of Heidenheim (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 09/665,249

(22) Filed: Sep. 18, 2000

Related U.S. Application Data

(63) Continuation of application No. PCT/DE98/03324, filed on Nov. 11, 1998.

(30) Foreign Application Priority Data

Mar. 18, 1998 (DE) .......................................... 198 11 862

(51) Int. Cl.$^7$ ................................................. H01G 2/10
(52) U.S. Cl. ..................... 361/517; 361/535; 361/519; 361/537
(58) Field of Search ................. 361/301.3, 517–519, 361/511, 535–538

(56) References Cited

U.S. PATENT DOCUMENTS 3,731,130 A * 5/1973 Dutta .......................... 361/272
4,288,843 A * 9/1981 Schroeder .................... 361/517
4,853,825 A * 8/1989 Utner ....................... 361/306.1

FOREIGN PATENT DOCUMENTS

| DE | 296 17 888 U1 | 6/1997 |
| GB | 866289 | 4/1961 |

OTHER PUBLICATIONS

Japanese Patent Abstract No. 03245518 (Kurihara), dated Nov. 1, 1991.

\* cited by examiner

Primary Examiner—Anthony Dinkins
(74) Attorney, Agent, or Firm—Herbert L. Lerner; Laurence A. Greenberg; Werner H. Stemer

(57) ABSTRACT

An aluminum electrolytic capacitor assembly for use on a mounting plate includes an aluminum electrolytic capacitor fitted in a metallic housing which in places has insulation composed of shrink sleeving. The aluminum electrolytic capacitor assembly is intended for use on a mounting plate. The shrink sleeving extends into the vicinity of the cup base, and a plastic cap is arranged on the cup base for insulation.

6 Claims, 3 Drawing Sheets

ALUMINUM ELECTROLYTIC CAPACITOR ASSEMBLY

CROSS-REFERENCE TO RELATED APPLICATION

This is a continuation of copending international application PCT/DE98/03324, filed Nov. 11, 1998, which designated the United States.

BACKGROUND OF THE INVENTION

Field of the Invention

The invention relates to an aluminum electrolytic capacitor assembly that is fitted in a metallic housing, which, in places, has insulation composed of shrink sleeving, and, which is intended for use on a mounting plate.

Such capacitors are known, for example, from the "Aluminum electrolytic capacitors" data book from Siemens Matsushita Components, 1994 issue, pages 117 to 121. The mounting plate is generally composed of metal and is used to dissipate heat losses that are produced during operation of such highly rated capacitors. The mounting is provided with the aid of ring clamps or attachment bolts. For insulation, insulating disks need to be arranged between the capacitor and the mounting plate.

For optimum heat dissipation via the cup base, the insulating layer on the base should be made as thin as possible. However, such thin insulating disks are impossible because, for handling reasons, they cannot be made less than a certain thickness.

Furthermore, for insulation reasons, it is expedient not to have any uninsulated points on the capacitor housing in the vicinity of the mounting plate. Although sizing the shrink sleeving to engage slightly around the housing base is possible, it also will cause undesirable gaps where the heat transfer is poor to occur between the housing base and the mounting plate. In order to overcome this difficulty, DE-UM 296 17 888 proposes that a step be arranged on the cup base. However, this reduces the diameter of the base, so that less heat can be dissipated. Furthermore, such an arrangement creates a risk of the housing being tilted with respect to the mounting plate if the housing is attached by means of a VELCRO® fastener.

SUMMARY OF THE INVENTION

It is accordingly an object of the invention to provide an aluminum electrolytic capacitor assembly that overcomes the herein afore-mentioned disadvantages of the heretofore-known devices of this general type and that mounts on a plate while minimizing the heat retained by the capacitor.

With the foregoing and other objects in view, there is provided, in accordance with the invention, an aluminum electrolytic capacitor assembly for use on a mounting plate including an aluminum electrolytic capacitor having connections and a region surrounding the connections; a metallic housing having an insulation composed of shrink sleeving and a cup base holding the aluminum electrolytic capacitor; the shrink sleeving surrounding the housing to such an extent that only the connections, the region, the cup base, and a part of the housing adjacent to the cup base are free; and a plastic cap arranged on the cup base for insulation, the plastic cap being drawn around the cup base toward the connections.

In accordance with another feature of the invention, the plastic cap overlaps the shrink sleeving. Alternatively, an edge of the shrink sleeving can overlap the plastic cap.

In accordance with another feature of the invention, the aluminum electrolytic capacitor assembly further includes an adhesive attaching the plastic cap to the cup base.

In accordance with another feature of the invention, the plastic base defines a hole while the base includes a bolt threaded to engage the hole.

In accordance with another feature of the invention, the plastic cap is composed of polyester.

The object of the present invention is to develop the aluminum electrolytic capacitor assembly cited initially in such a way that the above-mentioned difficulties are avoided.

This object is achieved according to the invention by extending the shrink sleeving extends into the vicinity of the cup base, and, in that, a plastic cap is arranged on the cup base for insulation.

Other features that are considered as characteristic for the invention are set forth in the appended claims.

Although the invention is illustrated and described herein as embodied in an aluminum electrolytic capacitor assembly, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENT

Figure 1:
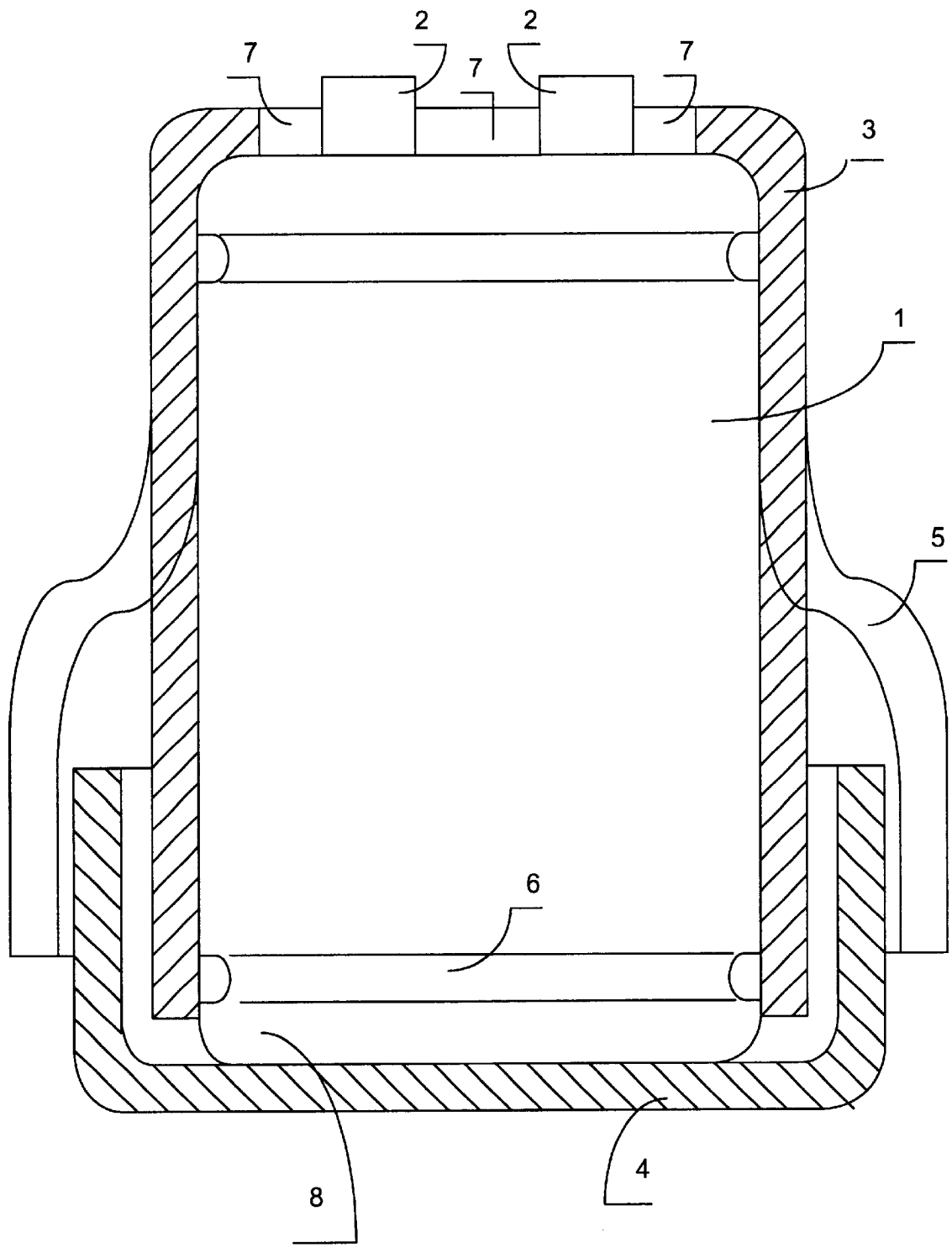
FIG. 1 of the drawings is a front cross-sectional view of an aluminum electrolytic capacitor assembly with shrink sleeving overlapping the cap.

In FIG. 1 of the drawings, 1 denotes a metallic housing, in general composed of aluminum, into which an aluminum electrolytic capacitor is fitted. The capacitor connections 2 are arranged at the upper end of the housing 1 in a region 7 surrounding the capacitor connections 2. For insulation, shrink sleeving 3 is arranged on the outer surfaces of the housing 1 and extends into the vicinity of the cup base 8, but does not engage around it.

A cap 4 composed of an insulating material, preferably polyester, which is as thin and soft as possible, is arranged on the cup base 8, and its internal diameter is slightly larger than the external diameter of the housing 1, in order to avoid air cushions.

As shown in FIG. 1, the cap 4, which engages around the shrink sleeving 3 on the outside, can be attached, for example, by means of an adhesive. The cap 4 also can be sold separately as an accessory.

Figure 2:
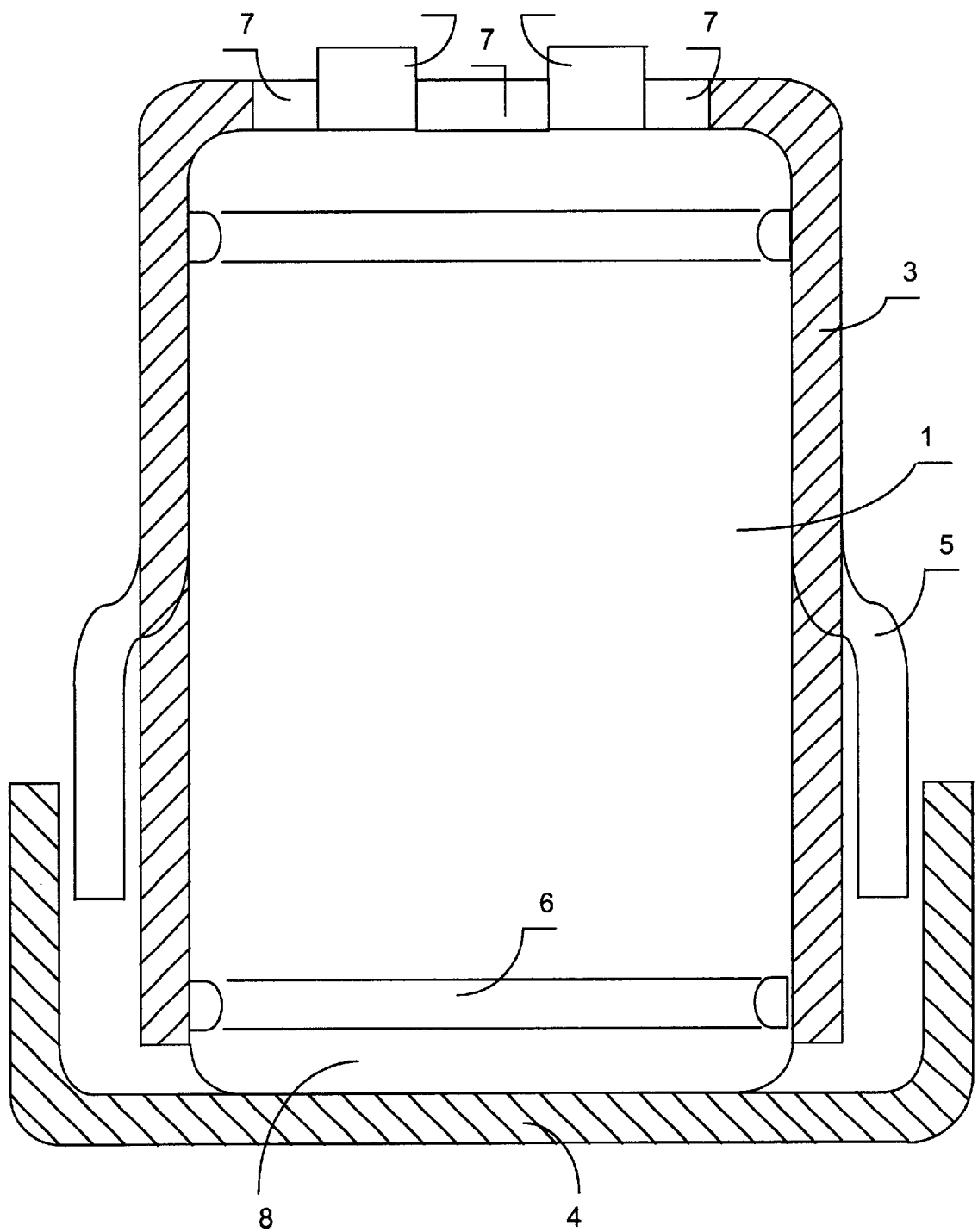
FIG. 2 of the drawings is a front cross-sectional view of an aluminum electrolytic capacitor assembly with the cap overlapping the shrink sleeving.

Alternatively, as shown in FIG. 2, the cap 4 can be arranged on the housing base before the shrink sleeving 3 is fitted, and then to shrink the shrink sleeving onto the housing 1, so that the end 5 of the shrink sleeving 3 encloses and secures the upper end of the cap 4.

Located in the housing 1 there is a base bead 6 in order to fit the housing 1 by means of a clamped attachment to the mounting plate, which is not shown in the drawing, as is described, by way of example, in DE 43 31 377 A1.

Figure 3:
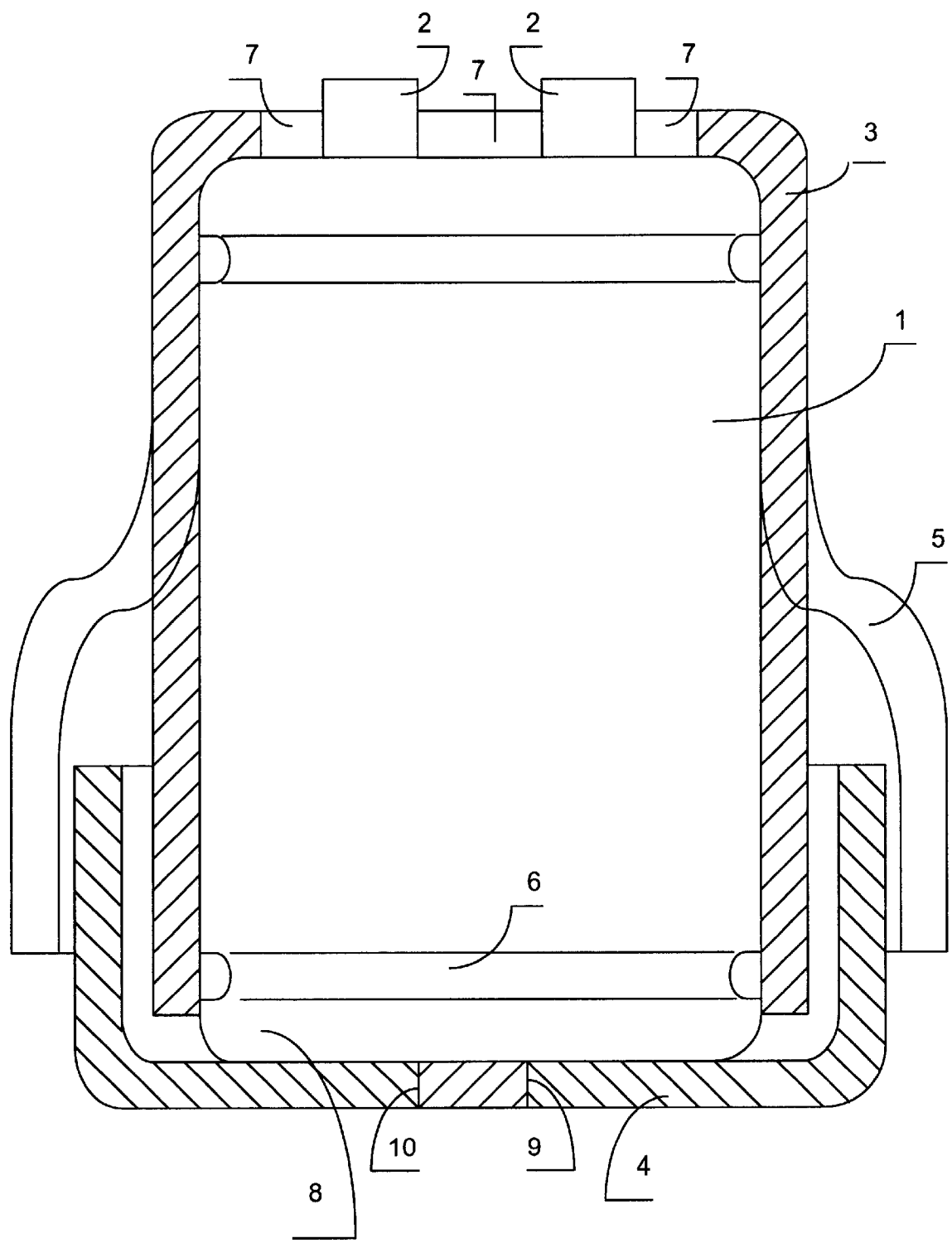
FIG. 3 of the drawings is a front cross-sectional view of an aluminum electrolytic capacitor assembly having a screw threaded through a hole to connect the base and cap.

As shown in FIG. 3, a threaded bolt 9 is arranged on the cup base 8 of the housing 1, a hole 10 is located at this point in the cap 4. The bolt 9 threads through the hole 10 to fasten the base 8 to the cap 4.

We claim:

1. An aluminum electrolytic capacitor assembly for use on a mounting plate comprising:

an aluminum electrolytic capacitor having connections and a region surrounding said connections;

a metallic housing having an insulation composed of shrink sleeving and a cup base holding said aluminum electrolytic capacitor;

said shrink sleeving surrounding said housing to such an extent that only said connections, said region, said cup base, and a part of said housing adjacent to said cup base are free; and a plastic cap arranged on said cup base for insulation, said plastic cap being drawn around said cup base toward said connections.

2. The aluminum electrolytic capacitor assembly according to claim 1, wherein said plastic cap overlaps said shrink sleeving.

3. The aluminum electrolytic capacitor assembly according to claim 1, further comprising:

an adhesive attaching said plastic cap to said cup base.

4. The aluminum electrolytic capacitor assembly according to claim 1, wherein an edge of said shrink sleeving overlaps the plastic cap.

5. The aluminum electrolytic capacitor assembly according to claim 1, wherein said plastic cap has a hole formed therein, and said cup base includes a bolt threaded to engage said hole.

6. The aluminum electrolytic capacitor assembly according to claim 1, wherein said plastic cap is composed of polyester.

* * * * *